US009365975B2

(12) United States Patent
Morton et al.

(10) Patent No.: US 9,365,975 B2
(45) Date of Patent: Jun. 14, 2016

(54) PRESS FELT FOR A PAPERMAKING MACHINE

(71) Applicant: Voith Patent GmbH, Heidenheim (DE)

(72) Inventors: Antony Morton, Ben Rhydding (GB); David Stuart Ponton, Blackburn (GB); Paul Raymond Riding, Blackburn (GB); Andrew Allum, Darwen (GB)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 14/504,941

(22) Filed: Oct. 2, 2014

(65) Prior Publication Data
US 2015/0020990 A1     Jan. 22, 2015

Related U.S. Application Data

(63) Continuation of application No. PCT/EP2013/057007, filed on Apr. 3, 2013.

(60) Provisional application No. 61/620,818, filed on Apr. 5, 2012.

(51) Int. Cl.
*D21F 7/08* (2006.01)
*B32B 37/18* (2006.01)
*B32B 37/24* (2006.01)

(52) U.S. Cl.
CPC . *D21F 7/08* (2013.01); *B32B 37/18* (2013.01); *B32B 37/24* (2013.01); *D21F 7/083* (2013.01); *B32B 2305/28* (2013.01); *B32B 2305/30* (2013.01)

(58) Field of Classification Search
None
See application file for complete search history.

(56) References Cited

U.S. PATENT DOCUMENTS

| 4,781,967 | A | 11/1988 | Legge et al. |
| 7,871,672 | B2 | 1/2011 | Crook et al. |
| 2006/0183391 | A1 | 8/2006 | Crook et al. |
| 2007/0163741 | A1 | 7/2007 | Crook |
| 2011/0262714 | A1* | 10/2011 | Allum et al. ............... 428/195.1 |

FOREIGN PATENT DOCUMENTS

DE      10 2005 054 509 A1      5/2007

OTHER PUBLICATIONS

Notification of Transmittal of the International Search Report and the Written Opinion of the International Searching Authority, or the Declaration dated Jul. 10, 2013 for International Application No. PCT/EP2013/057007 (13 pages).

* cited by examiner

*Primary Examiner* — Jacob Thomas Minskey
(74) *Attorney, Agent, or Firm* — Taylor IP, P.C.

(57) ABSTRACT

A press felt includes a base structure providing dimensional stability in a machine and a cross machine direction of the felt, a batt fiber structure including batt fiber layers attached to the base structure which provide a paper contacting side and a machine contacting side of the felt. The base structure includes a first and second side. Polymeric beads or strands made from a polymeric material are arranged on at least one of the two sides of the base structure. The polymeric beads or strands arranged on the at least one side have a longitudinal expansion in the machine direction of the felt and are arranged side-by-side when viewed in the cross machine direction of the felt to generate space between adjacent beads or strands. At least one of the batt fiber layers is arranged to cover both the at least one side and the polymeric beads or strands thereon.

20 Claims, 4 Drawing Sheets

FIG. 4E
FIG. 4F
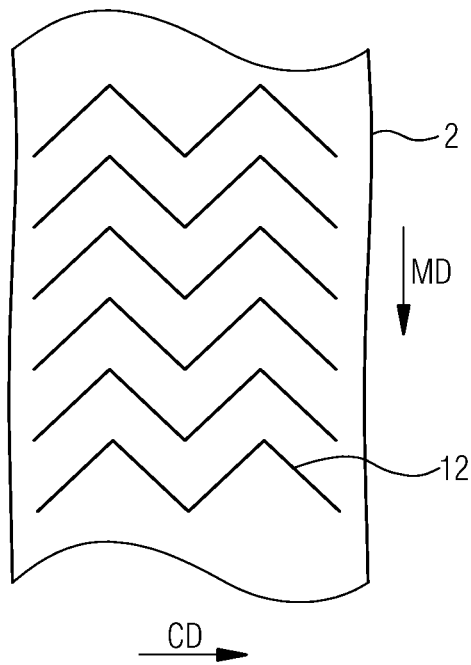
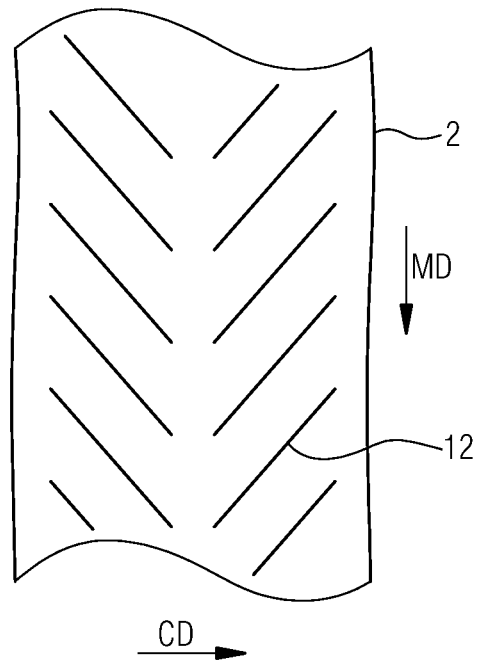

PRESS FELT FOR A PAPERMAKING MACHINE

CROSS REFERENCE TO RELATED APPLICATIONS

This is a continuation of PCT application No. PCT/EP2013/057007, entitled "PRESS FELT FOR A PAPERMAKING MACHINE," filed Apr. 3, 2013, which is incorporated herein by reference. PCT application No. PCT/EP2013/057007 is a PCT application based upon U.S. provisional patent application Ser. No. 61/620,818, entitled "PRESS FELT FOR A PAPERMAKING MACHINE," filed Apr. 5, 2012, which is incorporated herein by reference.

BACKGROUND OF THE INVENTION

1. Field of the Invention

The invention relates to a press felt for use in a press section of a paper, board or tissue machine.

2. Description of the Related Art

Press felts known in the art comprise a base structure which provides the dimensional stability of the felt and a batt fiber structure which is normally attached to the base structure by needling and which provides a paper and a machine contacting side of the felt.

During operation especially, the batt fiber structure is subjected to compaction-expansion cycles when the felt runs through the press nip. During compaction, the felt provides a reduced water take-up capability. After leaving the press nip the felt has to recover as quickly as possible to avoid rewetting of the paper sheet.

After several hundred thousand of compaction-expansion cycles the degree of recovery of the felt to its original thickness reduces irreversibly, leading to reduced void volume and therefore reduced water take-up capability of the felt. When the water take-up capability drops below a certain level, the felt has to be removed from the machine.

In the past, several attempts have been made to enhance the life time of such press felts. Most attempts were directed to optimize the batt fiber structure by providing coarser fibers in the batt fiber structure or by filling the batt fiber structure with polymeric material, e.g., polymeric material in particulate form, to maintain the degree of recovery after compaction over longer time. From U.S. Pat. No. 7,871,672 it is, for example, known to partially fill the void volume of the batt fiber structure with a solution with polymeric material in particulate form and melting the polymeric material to generate a composite structure of polymeric material and batt fibers.

The above described attempts were only in some cases successful and relatively expensive in manufacturing.

What is needed is a press felt which has improved water take-up capability. What is further needed is a felt with enhanced durability to withstand more compaction-expansion cycles than felts known in the art and which is cheaper to manufacture than the above mentioned felts known in the art.

SUMMARY OF THE INVENTION

The problem is solved with a press felt for the use in a press section of a material web producing and/or processing machine, in particular a paper, board or tissue machine, the press felt comprising:

a) a base structure providing the dimensional stability at least in a machine and a cross machine direction of the felt and a batt fiber structure comprising a plurality of batt fiber layers attached to the base structure which provide a paper contacting side and a machine contacting side of the felt, the base structure comprises a side facing the paper contacting side and another side facing the machine contacting side of the press felt;

b) a plurality of polymeric beads or strands made from a compressive resilient polymeric material and being arranged on at least one of the two sides of the base structure, wherein the polymeric beads or strands arranged on the at least one side
 have a longitudinal expansion at least partially in the machine direction of the press felt,
 are arranged side-by-side when viewed in the cross machine direction of the felt to generate space between adjacent of the beads or strands and
 have been formed on the at least one side by applying the polymeric material in a viscous or paste-like state onto the at least one side and subsequently causing hardening of the polymeric material, and wherein at least one of the batt fiber layers is arranged on the at least one side of the base structure with the polymeric beads or strands to cover both the at least one side and the polymeric beads or strands applied thereon.

The expression "longitudinal expansion at least partially in the machine direction" means that the beads or strands can have sections in their longitudinal expansion in which they extend only in the machine direction of the felt or the beads or strands can have sections in which they have a component of longitudinal expansion running in the machine direction as well as a component of longitudinal expansion running in the cross machine direction of the felt. The later mentioned case can be for example, if the beads or strands extend in diagonal lines or in curved lines relative to the machine direction of the felt.

By providing a press felt with beads or strands made from compressive resilient polymeric material which are arranged side-by-side when viewed in the cross machine direction of the felt and which have a longitudinal expansion in the machine direction of the felt, the spaces formed between adjacent beads or strands provide dewatering channels extending in the machine direction of the felt which are at least partially maintained when the felt is under pressure in the press nip and which therefore allow water to escape from the press nip which has been previously squeezed out of the paper web. The beads or strands further increase the compressive resilience and provide a quick compressive recovery of the felt to prevent rewetting of the paper web when leaving the press nip.

If the polymeric beads or strands are, for example, at least partially penetrated into the base structure, the base structure is less compacted in the press nip and recovers quicker to its original thickness when leaving the press nip compared to a press felt with the same base structure without the polymeric beads or strands. If the polymeric beads extend over the side of the base structure to which they have been applied the batt structure is less compacted in the press nip and recovers quicker to its original thickness when leaving the press nip compared to a press felt with the same batt fiber structure but without the polymeric beads or strands. The beads or strands further enhance the lifetime of the felt, because irreversible compaction of the felt can be reduced.

The press felt according to the invention can further be manufactured with a high degree of design freedom without major readjustment of the manufacturing process. The process of manufacturing the press felt according to the present invention can therefore be adjusted very easily and be done individually according to the requirements of each specific press felt without cost and time consuming adjustment of the manufacturing facilities, e.g. simply by polymer extrusion or printing techniques. A further advantage of the present invention is that the polymeric beads or strands can be applied in any shape needed for the specific application.

Alternate embodiments of the invention are further explained in the subclaims.

According to another embodiment of the invention, the beads or strands project in height above the at least one side of the base structure to which they have been applied and/or at least partially penetrate from the at least one side of the base structure to which they have been applied into the base structure.

According to a further embodiment of the present invention, the polymeric beads or strands have a longitudinal expansion at least partially in the cross machine direction of the felt. According to this embodiment, the polymeric beads or strands extend at least partially along their longitudinal expansion in a direction having a component in the machine direction of the felt and a component in the cross machine direction of the felt, as it might be, if the beads or strands extend in diagonal or curved lines.

According to a further embodiment of the present invention, the polymeric beads or strands form curved and/or straight lines at least partially along their longitudinal expansion. The polymeric beads or strands forming the curved lines can, for example, form a wavy line pattern on the base structure of the press felt. The polymeric beads or strands forming straight lines at least partially along their longitudinal expansion can form straight lines along their whole longitudinal expansion or a plurality of straight line sections which have an angular offset relative to each other to form, e.g., a zig-zag line pattern and/or a fish bone line pattern on the base structure of the press felt.

According to another embodiment of the present invention, the polymeric beads or strands are at least arranged over the working width of the press felt. Further it is possible that the longitudinal expansion of at least some of the polymeric beads or strands extends over the working width of the press felt and/or that the longitudinal expansion of at least some of the polymeric beads or strands extends over the length of the press felt. This embodiment of the invention provides a press felt with improved compressive resilience and compaction resistance properties over its whole working width and length.

According to a further embodiment of the present invention, at least some of the polymeric beads or strands form an interrupted line pattern along the length of the press felt. Such an interrupted line pattern can be generated by arranging a plurality of beads which have a longitudinal expansion which is less than the length of the press felt in series in the machine direction and side-by-side in the cross machine direction.

According to a further embodiment of the present invention, at least some of the polymeric beads or strands form an uninterrupted line pattern along the length of the press felt. Such an uninterrupted line pattern can be generated by arranging a plurality of beads which have a longitudinal expansion which is equal to the length of the press felt side-by-side in the cross machine direction.

The polymeric beads or strands can have a higher compressive resilience than the base structure and/or the batt fiber structure.

When the press felt is compressed in a press nip the compressive energy is absorbed by the polymeric beads, the base structure and the batt structure. Due to compressive force the base structure and the polymeric beads undergo deformation. If the polymeric beads or strands have a higher compressive resilience than the base structure and/or the batt fiber structure, the polymeric beads can be designed such that they will not be compressed in the press nip above the elastic limit under typical operational conditions in a press nip of a paper, board or tissue making and/or processing machine. Therefore it can be achieved that upon removal of the compressive loading, the energy is released such that the polymeric beads or strands quickly return to their original, uncompressed state.

If the space between adjacent polymeric beads or strands is too big, too high of a load is applied to each individual strand. If the space between adjacent polymeric beads or strands is too small, the permeability of the felt can be influenced negatively. To balance these two requirements, the space between adjacent side-by-side arranged polymeric beads or strands can be between 0.1 and 25 millimeters, between 0.3 and 10 millimeters, between 0.5 and 5 millimeters, or between 1.5 and 5 millimeters.

When viewed in the cross machine direction of the press felt, the space between adjacent first and second polymeric beads or strands can be different than the space between adjacent third and forth polymeric beads or strands. By doing so, the dewatering behaviour in the cross machine direction of the press felt can be easily influenced and adjusted to fullfill the requirements on a press felt of each individual paper machine.

When viewed in the cross machine direction of the press felt, the press felt can have a middle area which makes at least 50% of the width of the fabric and includes the working width of the felt. The middle area is—when viewed in the cross machine direction of the press felt—bordered on both sides by an edge area. According to another embodiment of the present invention, the space between adjacent polymeric beads or strands in one or both of the edge areas is different to the space between adjacent polymeric beads or strands in the middle area of the press felt.

Furthermore it is possible that the space between at least some of the adjacent side-by-side arranged polymeric beads or strands is constant along their longitudinal expansion. Alternatively, it is possible that the space between at least some of the adjacent side-by-side arranged polymeric beads or strands varies along their longitudinal expansion.

Depending on the required performance of the press felt, the polymeric beads or strands can be arranged only on one side or on both of the sides of the base structure. In both cases, the polymeric beads or strands can project in height above the surface of the side of the base structure to which they have been applied and/or penetrate from the side of the base structure to which they have been applied into the base structure.

Depending on the required performance of the press felt, it is further possible if the polymeric beads or strands penetrate into the base structure by an amount of between 0.1% and 50% of the overall thickness of the base structure. The deeper the penetration into the base structure, the better the mechanical interlocking between the polymeric material forming the beads and the base structure is, because the polymeric material flows around yarns forming the base structure.

To avoid possible sheet marking caused by imprints in the paper web because of the polymeric beads or strands projecting in height above the base structure, it can be useful if the polymeric beads or strands do not project in height above the side of the base structure which is facing to the paper contacting side of the press felt.

Due to the fact that the press felt is guided during its operation in the machine over a plurality of rolls leading to vibrational disturbances during operation of the felt, it can be useful to improve damping properties of the press felt.

According to a further embodiment of the present invention, it is therefore foreseen that the polymeric beads or strands project in height above the side of the base structure which is facing the machine contacting side of the press felt.

Furthermore, for certain applications it can be useful if the polymeric beads or strands project in height above the side of the base structure which is facing to the paper contacting side of the press felt. This could be useful for felts specially designed as marking felts or rippled felts to produce marked paper sheet for certain applications. Furthermore the polymeric beads or strands can be arranged on both sides of the base structure, wherein the polymeric beads or strands on each side project in height above the surface of the side of the base structure to which they have been applied.

Furthermore the polymeric beads or strands can extend only inside the base structure. This can, for example, be useful if only the water flow through the felt should be regulated.

Depending on the required performance of the press felt, the polymeric beads or strands can have a rounded or rectangular cross sectional shape and/or can have a height of between 0.1 and 2.0 millimeters, wherein the height of the polymeric beads or strands is the highest projection of the polymeric beads or strands above the side of the base structure to which the polymeric beads or strands have been applied. Furthermore the polymeric beads or strands can have a width of between 0.1 and 2.0 millimeters. The width to height ratio of the polymeric beads can be between 0.3 and 1.0.

Furthermore the hardened polymeric material can have a hardness of between 30 Shore A and 90 Shore A or between 50 and 90 Shore A. The polymeric material can be at least one of a silicone, a polyurethane, polyacrylate, epoxy, polyester or a polyolefin.

The base structure of the press felt according to the invention can comprise at least one of a woven structure, a knitted structure or a non-woven yarn array.

According to another embodiment of the present invention, the batt fiber structure of the press felt comprises several batt fiber layers arranged on at least the side of the base structure to which the polymeric beads or strands have been applied and the batt fiber layer which is directly arranged on the side of the base structure to cover both the side of the base structure and the polymeric beads or strands can have coarser fibers, especially if made from coarser fibers, than the other or the others of the batt fiber layers arranged on this side of the base structure and covering the batt fiber layer with the coarser fibers.

According to another embodiment of the present invention, a method of making a press felt is provided, the method comprising the following steps:
a) providing a base structure which provides a dimensional stability at least in a machine direction and a cross machine direction of the felt; the base structure having a first side and a second side opposing the first side;
b) providing a polymeric material in a viscous or paste-like state in an applicator and applying the polymeric material via the applicator onto the surface of at least one of the first and second side of the base structure while moving the applicator and the base structure relative to each other and thereby forming a plurality of polymeric beads or strands which have a longitudinal expansion in the machine direction of the felt and which are arranged side-by-side when viewed in the cross machine direction of the felt,
c) causing the polymeric beads or strands to harden and
d) attaching at least one batt fiber layer to the at least one side of the base structure to which the polymeric beads or strands have been applied to cover the side and the plurality of polymeric beads or strands.

It has to be noted that the sequence of the process steps c) and d) do not necessarily need to be that the polymeric material is hardened first before a batt fiber layer is attached to the side of the base to which the beads or strands have been applied. It also can be that after application of the beads or strands, the batt fiber layer is attached to the base structure before the polymeric material is caused to harden and in a subsequent step the whole arrangement is heat treated. This heat treatment can support or accelerate the hardening of the polymeric material.

If the polymeric material is applied on both sides of the base structure, this can be done by applying polymeric beads or strands first to one side followed by the application of polymeric beads or strands to the other side of the base structure.

The attaching of the batt fiber layer(s) can, e.g., be done by conventional needling techniques.

The height of the beads and/or the depth of penetration of the polymeric beads or strands into the base structure of the felt, can be controlled by adjusting the viscosity of the polymeric material in the viscous or paste-like state and/or the speed of application of the polymeric material in its viscous or paste-like state and/or the speed of relative movement between the applicator and the base structure such that the polymeric beads or strands when viewed in the thickness direction of the felt extend over the surface of the side of the base structure and/or at least partly into the base structure.

The polymeric material in a pasty or viscous state can be a reactive multi-component polymer. If the polymeric material is a polyurethane it can be a thermoplastic polyurethane. In concrete it is possible that the polyurethane is a reactive two or more component polyurethane.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 4A-4F are several top views on a side of a base structure with polymeric beads or strands which have different shapes along their longitudinal extension.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
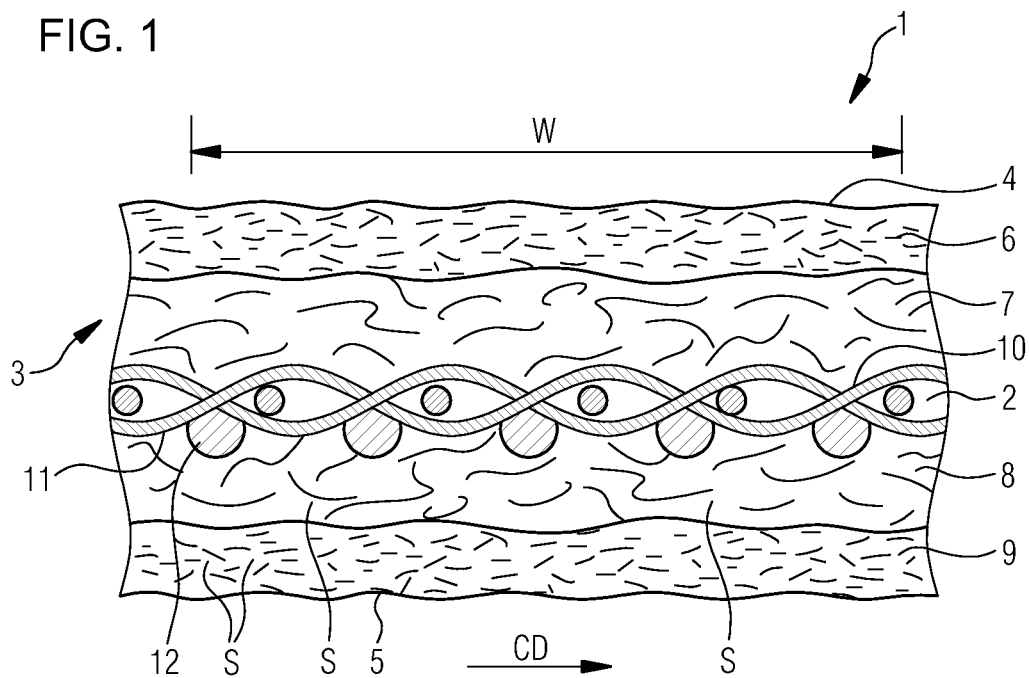
FIG. 1 is a cross-sectional view in the cross machine direction of an embodiment of a press felt according to the present invention.

Referring now to FIG. 1, a cross sectional view in a cross machine direction CD of a press felt 1 according to an embodiment of the present invention is shown. The press felt 1 has a woven base structure 2 that provides the dimensional stability at least in a machine direction MD and the cross machine direction CD of the felt 1 and a batt fiber structure 3 with a plurality of batt fiber layers 6, 7, 8, 9 attached to the base structure 2 that provides a paper contacting side 4 and a machine contacting side 5 of the felt 1.

Figure 2:
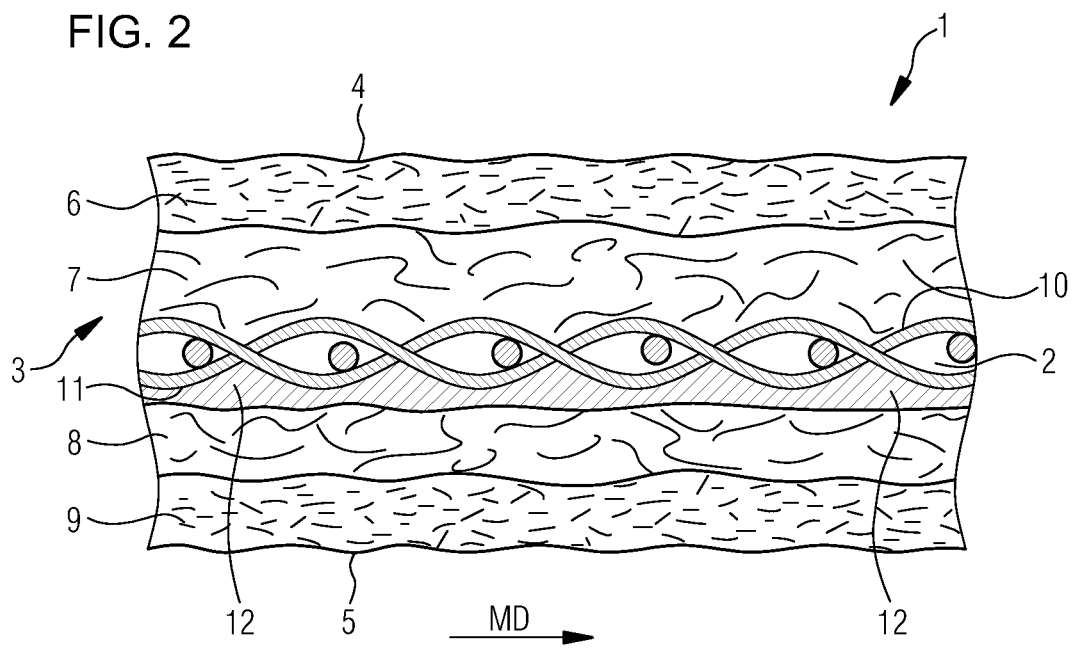
FIG. 2 is a cross-sectional view in the machine direction of the press felt shown in FIG. 1.

The batt fiber structure 3 of the embodiment as shown by press felt 1 of FIGS. 1 and 2 is made of the four batt fiber layers 6, 7, 8 and 9. The batt fiber layers 6 and 7 are attached to the base structure 1 on a first side 10 of the base structure 2 which is facing to the paper contacting side 4 and the batt fiber layers 8 and 9 are attached to a second side 11 of the base structure 2 which is facing to the machine contacting side 5.

According to an embodiment of the invention the felt 1 comprises a plurality of polymeric beads or strands 12 made from a compressive resilient polymeric material which are arranged on the second side 11 of the base structure 2 and which have been formed on the second side 11 of the base structure 2 by applying the polymeric material in a viscous or paste-like state onto the second side 11 of the base structure 2 and subsequently causing the polymeric material to harden. The polymeric beads or strands 12 have a higher compressive resilience than the base structure 2 and the batt fiber structure 3. Furthermore the polymeric beads or strands 12 are only arranged on the second side 11 of the base structure 2.

The batt fiber layer 8 on the second side 11 of the base structure 2, which is directly arranged on the second side 11 of the base structure 2 to cover the polymeric beads 12, can be made of coarser fibers than the batt fiber layer 9 providing the machine contacting side 5 of the press felt 1.

The polymeric beads or strands 12 have a rounded, similar to semicircular, cross section and have a height of between 0.1 and 2.0 millimeters and a width of between 0.1 and 2.0 millimeters. In the embodiment shown, the width to height ratio of the polymeric beads is between 0.8 and 1.0.

The polymeric material forming the polymeric beads or strands can have in its hardened state, a hardness of between 30 Shore A and 90 Shore A and be a polyurethane material.

Figure 3:
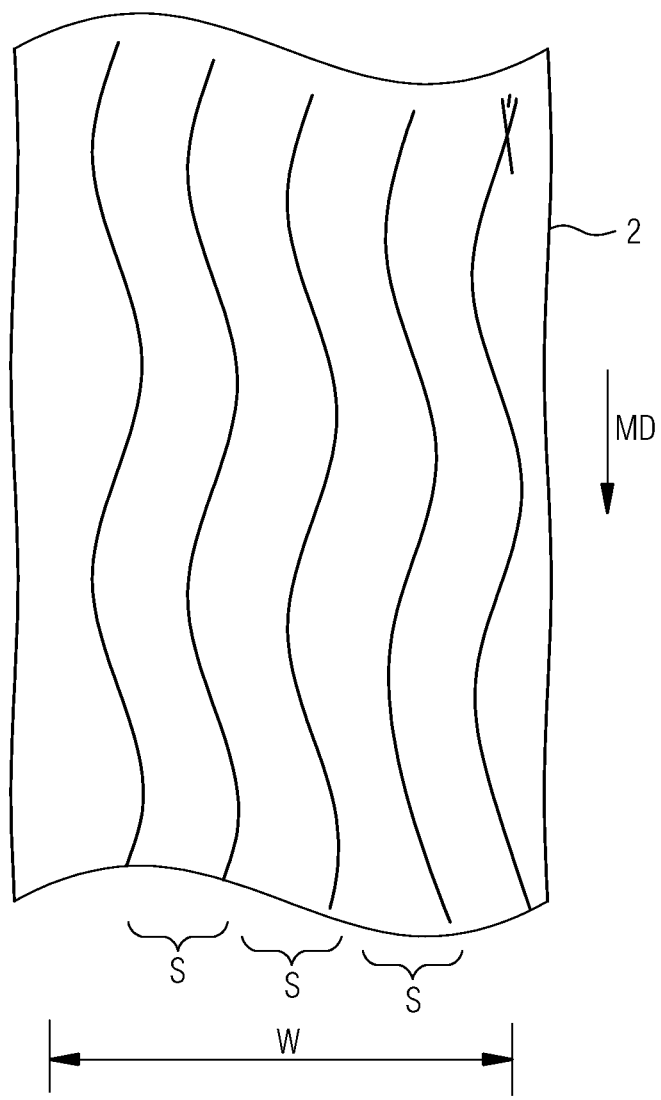
FIG. 3 is a top view on a side of the base structure of the press felt shown in FIGS. 1 and 2 on which pluralities of beads or strands have been formed prior the attachment of the batt fiber layers.

As can be seen from FIGS. 1, 2 and 3, the plurality of polymeric beads or strands 12 can have a longitudinal expansion in the machine direction MD of the felt 1 and are arranged side-by-side when viewed in the cross machine direction CD of the felt 1 to leave a space S between adjacent polymeric beads or strands 12. The plurality of polymeric beads or strands 12 project in height above the second side 11 of the base structure 2, and partly penetrate into the base structure 2, as can be seen from FIGS. 1 and 2.

As can be further seen from FIGS. 1 and 3, the polymeric beads or strands 12 are arranged over a working width W of the press felt 1. Furthermore, the polymeric beads or strands 12 can form curved lines along their longitudinal expansion. More concrete polymeric beads or strands 12 can form a wavy line pattern on top of the base structure 2. Furthermore as can be seen from FIG. 3, the longitudinal expansion of all polymeric beads or strands 12 can extend over the length of the press felt 1 such that the polymeric beads or strands 12 form an uninterrupted wavy line pattern along the length of the press felt 1.

The space S between adjacent side-by-side arranged polymeric beads or strands 12 can be between 0.3 and 10 millimeters, between 0.5 and 5 millimeters, or between 1.5 and 5 millimeters. It can be further seen that the space S between adjacent side-by-side arranged polymeric beads or strands 12 is constant along the longitudinal expansion of the beads or strands 12.

FIGS. 4A-4F show several top views on a side of a base structure with polymeric beads or strands which have different shapes along their longitudinal extension. To avoid unclarities, it has to be noted that for the needs of the current invention it is assumed that the length and width of the felt or press felt is the same as the length and width of the base structure. Therefore, when describing a width or length of the felt or base, the other of the two can be meant as well.

Figure 4A:
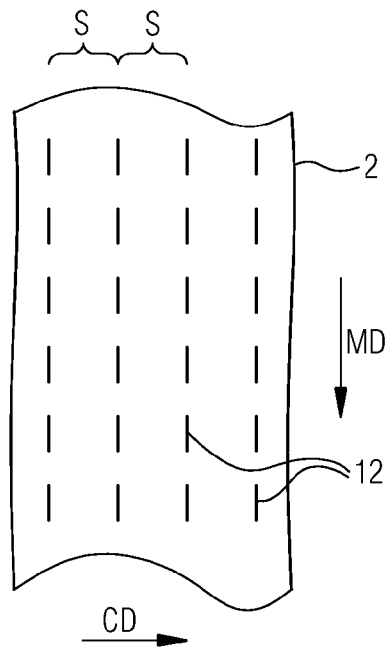

FIG. 4A shows a top view onto a base structure 2 with a plurality of polymeric beads 12 which form straight lines along their longitudinal expansion which only extend in the machine direction MD of base structure 2, shown as a press felt. As can be seen, all the polymeric beads or strands 12 have a longitudinal expansion which extends only over a part of the length of the base structure 2 and therefore form an interrupted line pattern along the length of the base structure 2. Furthermore, the space S between adjacent beads or strands 12 is constant along the longitudinal expansion of the beads or strands 12.

Figure 4B:
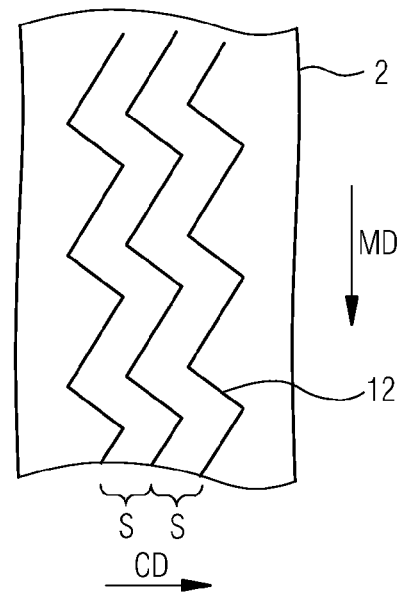

FIG. 4B shows a top view onto a base structure 2 with a plurality of polymeric beads 12 which form lines which extend in a zig-zag manner in the machine direction MD of base structure 2. The lines partially extend as straight lines along their longitudinal expansion. As can be seen, all the beads or strands 12 have a longitudinal expansion similar to the length of the base structure 2, shown as a felt. The beads or strands 12 therefore form uninterrupted line pattern along the length of the base structure 2. Furthermore the space S between adjacent beads or strands 12 is constant along the longitudinal expansion of the beads or strands 12.

Figure 4C:
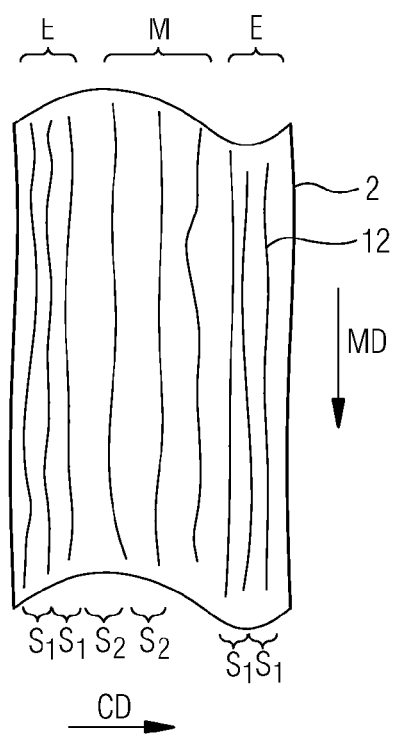

FIG. 4C shows a top view onto a base structure 2 with a plurality of polymeric beads 12 which form straight lines along their longitudinal expansion which only run in the machine direction MD of base structure 2. The straight lines provide a straight line pattern on the base structure 2 along the length of the base structure 2. The longitudinal expansion of all beads or strands 12 extend over the length of the base structure 2, the beads or strands 12 therefore form an uninterrupted straight line pattern. Furthermore the space S1, S2 between adjacent beads or strands 12 is constant along the longitudinal expansion of the beads or strands 12. When viewed in the cross machine direction CD of the press felt, the felt has a middle area M which makes at least 50% of the width of the fabric. The middle area is bordered on each side by an edge area E. As can be seen, the space S1 between adjacent polymeric beads or strands 12 in the edge areas E is different to the space between adjacent polymeric beads or strands 12 in the middle area M of the base structure 2.

Figure 4D:
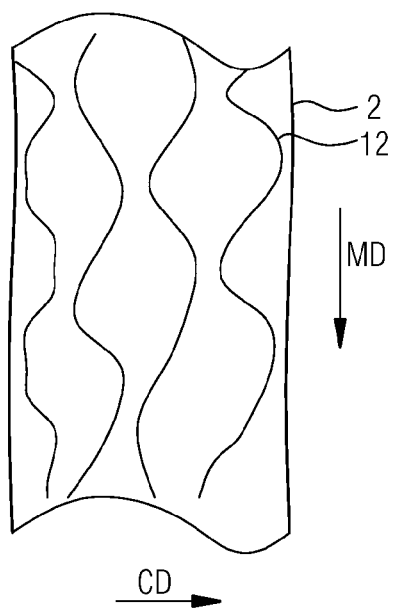

FIG. 4D shows a top view onto a base structure 2 with a plurality of polymeric beads 12 which form curved lines along their longitudinal expansion extending in the machine direction MD of the base structure 2. As can be seen, the beads or strands 12 form a wavy line pattern on the base structure 2. Further, it can be seen that all polymeric beads or strands 12 have a longitudinal expansion over the length of the press felt. Furthermore, the space S between adjacent beads or strands 12 varies along the longitudinal expansion of the beads or strands 12.

FIG. 4E shows a top view onto a base structure 2 with a plurality of polymeric beads 12 which form lines along their longitudinal expansion which run in the machine direction MD and in the cross machine direction CD of base structure 2. More specifically the beads or strands 12 extend along their longitudinal expansion diagonal to the machine direction MD of the base structure 2 and form a zig-zag line pattern on top of the base structure 2. Further, it can be seen that the longitudinal expansion of the beads or strands 12 extends at least over the working width of the base structure 2, shown as a press felt. As can be seen, the polymeric beads or strands 12 form an uninterrupted line pattern along the working width of the base structure 2, shown as a press felt.

FIG. 4F shows a top view onto a base structure 2 with a plurality of polymeric beads 12 which form straight lines along their longitudinal expansion which run diagonal to the machine direction MD of base structure 2. More specifically the beads or strands 12 form a fish bone line pattern on the base structure 2. Further, it can be seen that the longitudinal expansion of the beads or strands 12 is only over a part of the working width and the length of the press felt/base structure 2. As can be seen, the polymeric beads or strands 12 form an uninterrupted line pattern along the working width and the length of the base structure 2, shown as a press felt.

Features of the above described embodiments easily can be exchanged and combined without leaving the cope of the present invention, depending on the required performance of the press felt.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A press felt for the use in a press section of a material web producing or processing machine, in particular a paper, board or tissue machine, the press felt comprising:
   a base structure providing the dimensional stability at least in a machine direction and a cross machine direction of said felt, said base structure including a first side and a second side;
   a batt fiber structure comprising a plurality of batt fiber layers attached to said base structure which provide a paper contacting side and a machine contacting side of said felt, said paper contacting side facing said first side of said base structure and said machine contacting side facing said second side of said base structure; and
   a plurality of polymeric one of beads and strands made from a compressive resilient polymeric material arranged on at least one of said first side and said second side of said base structure, said plurality of polymeric one of beads and strands arranged on said at least one side have a longitudinal expansion at least partially in the machine direction of said press felt, are arranged side-by-side when viewed in the cross machine direction of said felt to generate space between adjacent polymeric one of beads and strands and have been formed on said at least one side of said base structure by applying said polymeric material in one of a viscous state and a paste-like state onto said at least one side of said base structure and subsequently causing hardening of said polymeric material, wherein at least one of said batt fiber layers is arranged on said at least one side of said base structure with said plurality of polymeric one of beads and strands to cover both said at least one side and said plurality of polymeric one of beads and strands applied thereon, wherein said plurality of polymeric one of beads and strands project in height above said at least one side to which said plurality of polymeric one of beads and strands have been arranged and at least partially penetrate from said at least one side to which said plurality of polymeric one of beads and strands have been arranged into said base structure.

2. The press felt according to claim 1, wherein said plurality of polymeric one of beads and strands have a longitudinal expansion at least partially in the cross machine direction of said felt.

3. The press felt according to claim 1, wherein said plurality of polymeric one of beads and strands form at least one of curved lines and straight lines at least partially along their longitudinal expansion.

4. The press felt according to claim 1, wherein said plurality of polymeric one of beads and strands are arranged at least over a working width of said press felt.

5. The press felt according to claim 1, wherein at least one of the longitudinal expansion of at least some of said plurality of polymeric one of beads and strands extends over a working width of said press felt and the longitudinal expansion of at least some of said plurality of polymeric one of beads and strands extends over a length of said press felt.

6. The press felt according to claim 5, wherein at least some of said plurality of polymeric one of beads and strands form an uninterrupted line pattern along said length of said press felt.

7. The press felt according to claim 6, wherein at least some of said plurality of polymeric one of beads and strands form an interrupted line pattern along said length of said press felt.

8. The press felt according to claim 1, wherein said plurality of polymeric one of beads and strands have a higher compressive resilience than at least one of said base structure and said batt fiber structure.

9. The press felt according to claim 1, wherein the space between adjacent side-by-side arranged polymeric one of beads and strands is between 0.3 and 10 millimeters.

10. The press felt according to claim 9, wherein the space between adjacent side-by-side arranged polymeric one of beads and strands is between 0.5 and 5 millimeters.

11. The press felt according to claim 10, wherein the space between adjacent side-by-side arranged polymeric one of beads and strands is between 1.5 and 5 millimeters.

12. The press felt according to claim 1, wherein the space between adjacent side-by-side arranged polymeric one of beads and strands is constant along the longitudinal expansion of said one of beads and strands.

13. The press felt according to claim 1, wherein the space between adjacent side-by-side arranged polymeric one of beads and strands varies along the longitudinal expansion of said one of beads and strands.

14. The press felt according to claim 1, wherein said plurality of polymeric one of beads and strands are only arranged on said second side of said base structure.

15. The press felt according to claim 1, wherein each of said plurality of polymeric beads has a width and a height and a ratio of said width to said height is between 0.3 and 1.0.

16. The press felt according to claim 1, wherein said batt fiber structure includes several batt fiber layers on said at least one side of said base structure with said plurality of polymeric one of beads and strands and wherein a batt fiber layer directly arranged on said side of said base structure to cover said plurality of polymeric one of beads and strands has coarser fibers than the rest of said several batt fiber layers on said at least one side of said base structure.

17. The press felt according to claim 1, wherein said base structure comprises at least one of a woven structure, a knitted structure, and a non-woven yarn array.

18. A method of making a press felt for the use in a press section of a web producing machine, in particular a paper, board or tissue machine, the method comprising the steps of:
   providing a base structure which provides the dimensional stability of the felt and a batt fiber structure comprising a plurality of batt fiber layers attached to said base structure, said base structure having a first side and a second side opposing said first side;

providing a polymeric material in one of a viscous state and a paste-like state in an applicator and applying said polymeric material via said applicator on at least one of said first side and said second side of said base structure while moving said applicator and said base structure relative to each other and thereby forming a plurality of polymeric one of beads and strands which run in a longitudinal extension in a machine direction of said felt and which are arranged side-by-side when viewed in a cross machine direction of said felt to generate space between adjacent polymeric one of beads and strands;

causing said plurality of polymeric one of beads and strands to harden, thereby forming strands of a compressive resilient polymeric material, wherein said polymeric one of beads and strands project in height above said at least one side to which said plurality of polymeric one of beads and strands have been applied and at least partially penetrate from said at one side to which said plurality of polymeric one of beads and strands have been applied into said base structure; and attaching at least one batt fiber layer to said at least one side onto which said plurality of polymeric one of beads and strands have been applied to cover said at least one side and said plurality of polymeric one of beads and strands.

19. The method according to claim 18, wherein at least one of a viscosity of said viscous state polymeric material, a viscosity of said paste-like polymeric material, the speed of application of the viscous state polymeric material, the speed of application of the paste-like polymeric material, and the speed of relative movement between said applicator and said base structure is adjusted such that said plurality of polymeric one of beads and strands at least one of extend over a side of said base structure and at least partly extend into said base structure when viewed in a thickness direction of said felt.

20. The method according to claim 18, wherein said base structure comprises at least one of a woven structure, a knitted structure, and a non-woven yarn array.

\* \* \* \* \*